Aug. 12, 1941.  E. F. ZAP  2,252,657
AIRFOIL SLOT
Original Filed March 11, 1938
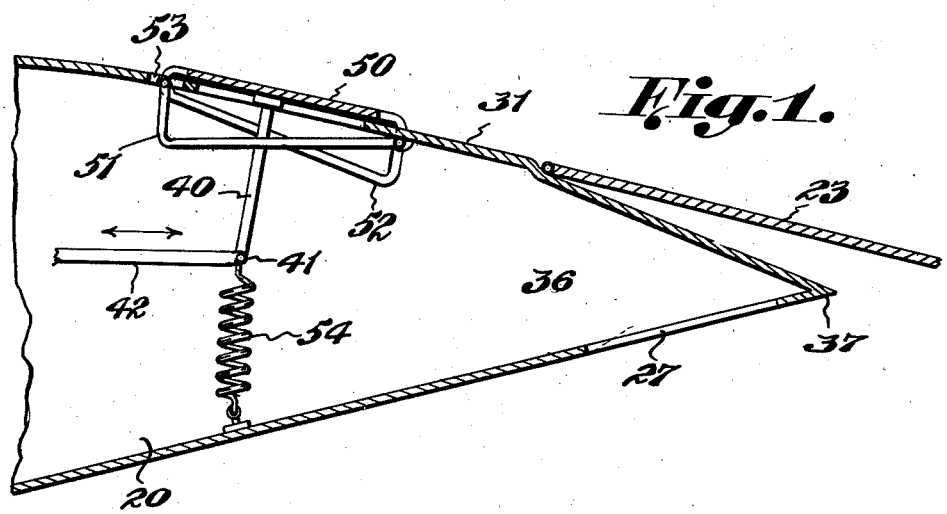
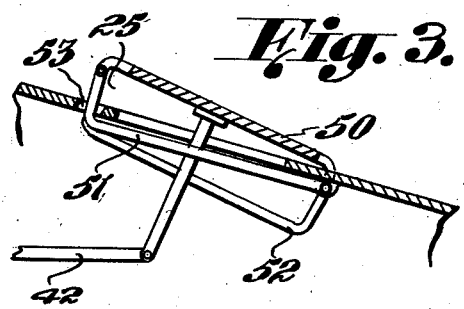
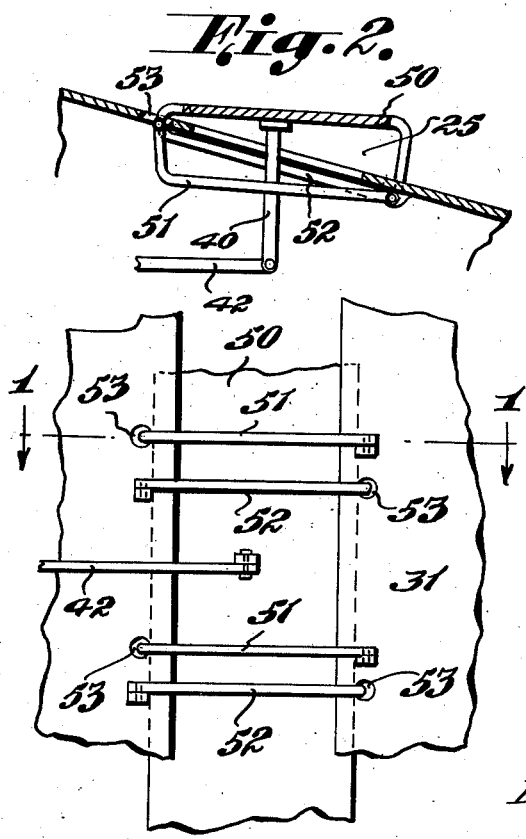
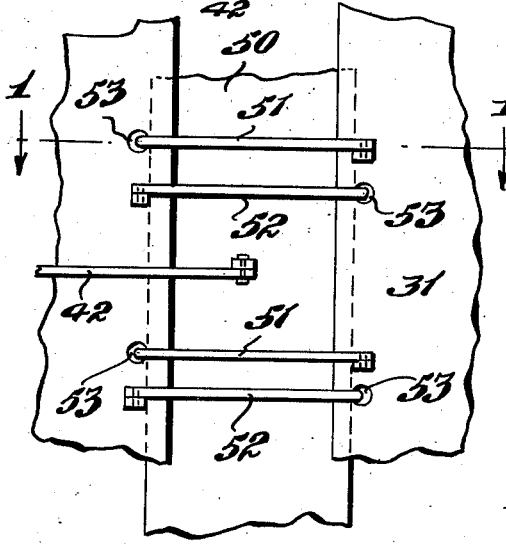
INVENTOR,
Edward F. Zap
BY
ATTORNEY Patented Aug. 12, 1941

2,252,657

UNITED STATES PATENT OFFICE 2,252,657

AIRFOIL SLOT

Edward F. Zap, Westwood Village, Calif.

Original application March 11, 1938, Serial No. 195,381. Divided and this application August 30, 1939, Serial No. 292,726

1 Claim. (Cl. 244—42)

This application is a division carved out of application Ser. No. 195,381, filed March 11, 1938.

This invention relates to wings of airplanes with variable aerodynamic characteristics, so that they can be modified by the pilot during flight for giving best service during the various maneuvers. The invention includes the use of my novel modification by way of quasi ailerons for obtaining lateral control.

My novel airfoil modification device has a great many advantages, all of which cooperate with each other so as to make each single advantage of peculiar value. It requires control displacement motions and control forces of moderate magnitude. It acts quickly and without undue delay. It includes in its effects a very quick and thorough lift elimination or lift spoiling, so conveniently obtained that it is feasible and contemplated to connect the control for lift spoiling with the control for the wheel brakes, so that the lift is automatically spoiled whenever the wheel brakes are actuated, and the wheel brake action thereby multiplied in effectiveness. My wing control is free from icing troubles, because in neutral position no narrow passages remain open and give opportunity to ice to deposit.

My wing modifying device can be used for replacing the conventional ailerons. It offers then the considerable advantage of partly or even wholly eliminating the unfavorable yawing moment associated with the creation of a lateral moment by conventional ailerons. That is to say, my novel lateral control does not tend to turn the airplane about a vertical axis so that the wing lifted up is retarded.

My novel lateral control offers distinct advantages in cooperation with flap means serving as high lift devices. It permits extending such flaps all the way from one tip to the other, leaving them fully operative through the entire span. It does not restrict the flaps or the region of their full operativeness to extend from the inner end of one aileron or quasi aileron to the inner end of the other aileron or quasi aileron only.

Another advantage of my control used in such cooperation resides in a changeableness of the control capacity for equal displacement of the control. The control capacity is different according to whether the airfoil is in its high lift or in its low drag condition in such manner that the control capacity is larger with high lift, that is at low speed, than with low drag, that is at high speed. That is a considerable advantage. For with conventional airplanes, there is an excess of lateral control at high speed, inviting danger of over-control, and there is a scarcity of lateral control at low speed, interfering with good maneuverability, just when that is most desired. My control ameliorates both defects.

It is the object of my invention to provide for airfoil lift variation means having all these advantages, or any of them by itself or in combination.

That is accomplished by providing the wing with slot means adapted to emit at the top side of the airfoil an air jet in forward direction, that is opposite to the direction of air flow. That jet may be turned on or off by the pilot. As an alternative and further improvement, forwardly directed jets and rearwardly directed jets are provided, and are put under the control of the pilot. The slot means extend substantially in spanwise direction. A single passage may often be sufficient, but the invention can also be used with multiple or branched passages serving as slots. The slot is preferably positioned behind the major portion of the airfoil section. For lateral control, at least two such jet emitting slots are contemplated, one at each wing, preferably extending into the tip regions. It is preferred to employ forwardly and rearwardly discharging exits at each side, and to create a lateral control moment by simultaneously discharging a forwardly directed jet on one side and a rearwardly directed jet on the other. During the later phases of landing, the lift of both wings is spoiled by discharging a forwardly directed jet on both sides. The contact between the ground and the moving or motionless airplane is thereby greatly improved.

These and other desirable objects and advantages of the present invention will be illustrated in the accompanying drawing and described in the specification, certain preferred embodiments being disclosed by way of illustration only; for, since the underlying principles may be incorporated in other specific devices, it is not intended to be limited to the ones here shown, except such limitations are clearly imposed by the appended claim.

In the drawing, like numerals refer to similar parts throughout the several views, in which:

Fig. 1 is a partial cross section through the trailing edge portion of an airfoil, incorporating the invention, Figs. 2 and 3 show the upper portion of Fig. 1 with the slot closing device in different characteristic positions, and Fig. 4 represents a plan view of the mechanism of Fig. 1, seen from the inside of the wing, looking upwardly.

In Fig. 1 there is shown the rear portion of an airfoil designated broadly by 20, and having a trailing edge 37. The inside of the airfoil communicates with the outer air space through an upper spanwise extending exit slot 25 and through a corresponding lower slot entrance 27. This entrance, this exit, and the inside of the wing communicating therewith, in unison, constitute slot means 36 broadly. The same are positioned behind the station of maximum thickness of the airfoil. Entrance 27 is adjacent the trailing edge 37 and in rear of exit 25. The airfoil 20 is provided with a flap 23.

During steady straight flight, the upper slot exit 25 is tightly closed by a cover member 50. This is shown in Fig. 1, cover 50 being then flush with wing wall 31. A plurality of pairs of arched rods 51 and 52 extend through the wing wall 31, through apertures 53, the forward end of 52 being hinged to wing wall 31 and its rearward end being hinged to cover 50, and, conversely, the rearward end of 51 being hinged to the wing wall, and its forward end to the cover. Fastened to the cover is a lever 40 hinged at 41 to the pushrod 42, and a tension spring 54 is provided to positively draw the cover 50 downwardly, the spring connecting the fixed wing structure with the end of lever 40. If pushrod 42 is shifted rearwardly, cover 50 is turned about its forward edge, and its trailing edge is lifted up, into position shown in Fig. 2, forming then a rearwardly open slot exit. If pushrod 42 is shifted forwardly, cover 50 is turned or rotated about its rearward edge, and its leading edge is lifted up, into position as shown in Fig. 3, forming then a forwardly open slot exit, 25.

Fig. 2 represents the cover in the high lift position, Fig. 3 in the low lift or spoiled lift position.

I claim:

In an airplane, an airfoil having means including a substantially spanwise extending slot in the upper surface of the airfoil connecting the space over the airfoil with the space below it, a cover over the slot mounted rotatable about its forward edge and rotatable about its rear edge, and control means operable by the pilot during flight, for turning the cover selectively about either of said edges from its neutral position flush with the airfoil top.

EDWARD F. ZAP.